US012566431B2

(12) United States Patent　　　(10) Patent No.:　US 12,566,431 B2

Giaconi et al.　　　　　　　　　　(45) Date of Patent:　Mar. 3, 2026

---

(54) SENSOR ANOMALY DETECTION

(71) Applicant: BRITISH TELECOMMUNICATIONS PUBLIC LIMITED COMPANY, London (GB)

(72) Inventors: Giulio Giaconi, London (GB); Samuel Moore, London (GB); Christopher Nugent, London (GB); Shuai Zhang, London (GB); Ian Cleland, London (GB)

(73) Assignee: British Telecommunications Public Limited Company, London (GB)

( * ) Notice: Subject to any disclaimer, the term of this patent is extended or adjusted under 35 U.S.C. 154(b) by 603 days.

(21) Appl. No.: 17/997,421

(22) PCT Filed: Apr. 21, 2021

(86) PCT No.: PCT/EP2021/060459

§ 371 (c)(1),
(2) Date: Oct. 28, 2022

(87) PCT Pub. No.: WO2021/219467

PCT Pub. Date: Nov. 4, 2021

(65) Prior Publication Data

US 2023/0168668 A1　　　Jun. 1, 2023

(30) Foreign Application Priority Data

Apr. 30, 2020　(EP) ..................................... 20172509
Apr. 30, 2020　(GB) ..................................... 2006411

(51) Int. Cl.
　　*G05B 23/02*　　　　(2006.01)
　　*G06F 17/18*　　　　(2006.01)
　　　　　　(Continued)

(52) U.S. Cl.
　　CPC ....... *G05B 23/0254* (2013.01); *G05B 23/024* (2013.01); *G05B 23/027* (2013.01);
　　　　　　(Continued)

(58) Field of Classification Search
　　CPC .............. G05B 23/0254; G05B 23/024; G05B 23/027; G16Y 40/10; G16Y 40/50; G06F 17/18; G06F 18/295
　　See application file for complete search history.

(56) References Cited

U.S. PATENT DOCUMENTS 5,465,321 A　　11/1995　Smyth
6,989,742 B2　　1/2006　Ueno et al.
　　　　　　(Continued)

FOREIGN PATENT DOCUMENTS

CN　　105722129 A　　6/2016
CN　　107438052 A　　12/2017
　　　　　　(Continued)

OTHER PUBLICATIONS

Casagrande et al., "Predicting Sensor Events, Activities, and Time of Occurrence Using Binary Sensor Data From Homes With Older Adults" IEEE Access vol. 7, 2019 (Year: 2019).*
　　　　　　(Continued)

*Primary Examiner* — John C Kuan
(74) *Attorney, Agent, or Firm* — EIP US LLP

(57)　　　　ABSTRACT

A method of identifying anomalous data obtained by at least one sensor of a plurality of sensors located within an environment. The method includes identifying, based on sensor data obtained from the plurality of sensors, at least one instance of a sequence of events that occurred within the environment. A probability of the sequence of events occurring within the environment under non-anomalous conditions is obtained. A frequency characteristic dependent on a frequency at which the sequence of events occurred within
　　　　　　(Continued)

the environment is determined. A likelihood of the sequence of events occurring within the environment at the frequency is determined, based on a combination of the probability and the frequency characteristic. It is identified, based on the likelihood, that at least a portion of the sensor data is anomalous.

19 Claims, 4 Drawing Sheets

(51) Int. Cl.
| | |
|---|---|
| *G06F 18/20* | (2023.01) |
| *G16Y 40/10* | (2020.01) |
| *G16Y 40/50* | (2020.01) |

(52) U.S. Cl.
CPC .............. *G16Y 40/10* (2020.01); *G16Y 40/50* (2020.01); *G06F 17/18* (2013.01); *G06F 18/295* (2023.01)

(56) References Cited

U.S. PATENT DOCUMENTS

| | | | |
|---|---|---|---|
| 7,930,752 | B2 | 4/2011 | Hertzog et al. |
| 9,225,738 | B1 | 12/2015 | Chiles |
| 9,253,201 | B2 | 2/2016 | Song et al. |
| 9,471,544 | B1 | 10/2016 | Yu |
| 9,516,053 | B1 | 12/2016 | Muddu et al. |
| 10,063,576 | B2 | 8/2018 | Song et al. |
| 10,425,702 | B2 | 9/2019 | Trainor et al. |
| 10,475,141 | B2 * | 11/2019 | McIntosh ............... G16H 15/00 |
| 10,673,880 | B1 | 6/2020 | Pratt et al. |
| 11,159,415 | B2 | 10/2021 | McLean et al. |
| 2003/0117279 | A1 | 6/2003 | Ueno et al. |
| 2007/0300300 | A1 | 12/2007 | Guo et al. |
| 2010/0131952 | A1 | 5/2010 | Akiyama et al. |
| 2011/0145185 | A1 | 6/2011 | Wang et al. |
| 2014/0254772 | A1 | 9/2014 | Williams et al. |
| 2017/0230410 | A1 | 8/2017 | Hassanzadeh et al. |
| 2017/0244749 | A1 | 8/2017 | Shulman et al. |
| 2018/0004941 | A1 | 1/2018 | Reinecke et al. |
| 2018/0004948 | A1 | 1/2018 | Martin et al. |
| 2019/0182279 | A1 | 6/2019 | Song et al. |
| 2019/0323869 | A1 * | 10/2019 | Kodeswaran ............ G01D 3/08 |
| 2019/0370143 | A1 | 12/2019 | Salunke et al. |
| 2023/0153428 | A1 | 5/2023 | Mitani et al. |
| 2023/0171277 | A1 | 6/2023 | Nugent et al. |

FOREIGN PATENT DOCUMENTS

| | | | |
|---|---|---|---|
| EP | 1324290 | A2 | 7/2003 |
| EP | 1708414 | A1 | 10/2006 |
| EP | 3242240 | A1 | 11/2017 |
| EP | 3242240 | B1 | 11/2018 |
| EP | 3528457 | A2 | 8/2019 |
| EP | 3531329 | A1 | 8/2019 |
| GB | 2547201 | A | 8/2017 |
| KR | 100950079 | B1 | 3/2010 |

OTHER PUBLICATIONS

Ordonez et al., "Sensor-based Bayesian detection of anomalous living patterns in a home setting" Pers Ubiquit Comput (2015) 19: 259-270 (Year: 2015).*
Zhu et al., "Wearable Sensor-Based Behavioral Anomaly Detection in Smart Assisted Living Systems" IEEE Transactions on Automation Science and Engineering, vol. 12, No. 4, Oct. 2015 (Year: 2015).*
Al-Fuqaha A., et al., "Internet of Things: A Survey on Enabling Technologies, Protocols, and Applications," IEEE Communication Surveys & Tutorials, vol. 17, No. 4, Fourth Quarter 2015, pp. 2347-2376.

Blanco R., et al., "Anomaly Detection Using Gaussian Mixture Probability Model to Implement Intrusion Detection Systems," HAIS 2019, Hybrid Artificial Intelligent Systems, Retrieved from the Internet: https://link.springer.com/chapter/10.1007%2F978-3-030-29859-3_55, pp. 648-659.
Carnevali L., et al., "Learning Marked Markov Modulated Poisson Processes for Online Predictive Analysis of Attack Scenarios," 2019 IEEE 30th International Symposium on Software Reliability Engineering, IEEE, XP033708665, pp. 195-205.
Chandola V., et al., "Anomaly Detection for Discrete Sequences: A Survey," IEEE Transactions on Knowledge and Data Engineering, vol. 24, No. 5, May 2012, pp. 823-839.
Chatterjee S., "Anomaly Detection Strategies for IoT Sensors," Feb. 12, Retrieved from the internet: https://medium.com/analytics-vidhya/anomaly-detection-strategies-for-iot-sensors-6281e84263df, undated, 16 pages.
Chen L., et al., "Sensor-based Activity Recognition," IEEE Transactions on Systems, Man, and Cybernetics—Part C: Applications and Reviews, Nov. 2012, vol. 42, No. 6, pp. 790-808.
Colakovic A., et al., "Internet of Things (Iot): A Review of Enabling Technologies, Challenges, and Open Research Issues," Revised on May 18, 2018, 27 pages.
Combined Search and Examination Report under Sections 17 and 18(3) for Great Britain Application No. 2006412.7, mailed on Oct. 6, 2020, 9 pages.
Desnitsky V.A., et al., "Detection of Anomalies in Data for Monitoring of Security Components in the Internet of Things," IEEE, 2015, pp. 189-192.
Diaz M., et al., "State-of-the-Art, Challenges, and Open Issues in the Integration of Internet of Things and Cloud Computing," Journal of Network and Computer Applications, 2016, vol. 67, pp. 99-117.
Diro A.A., et al., "Deep Learning: The Frontier for Distributed Attack Detection in Fog-to-Things Computing," IEEE Communications Magazine, Feb. 2018, pp. 169-175.
Evans D., "The Internet of Things—How the Next Evolution of the Internet is Changing Everything," White Paper, Apr. 2011, 11 pages.
Extended European Search Report for Application No. 20172509.0, mailed on Oct. 22, 2020, 9 pages.
Extended European Search Report for Application No. 20172518.1, mailed on Sep. 8, 2020, 11 pages.
Fekade B., et al., "Probabilistic Recovery of Incomplete Sensed Data in IoT," IEEE Internet of Things Journal, Aug. 2018, vol. 5, No. 4, pp. 2282-2292.
International Search Report and Written Opinion for Application No. PCT/EP2021/060459, mailed on Jul. 9, 2021, 11 pages.
International Search Report and Written Opinion for Application No. PCT/EP2021/060460, mailed on May 7, 2021, 14 pages.
Karkouch A., et al., "Data Quality in Internet of Things: A State-of-the Art Survey," Journal of Network and Computer Applications, 2016, vol. 73, pp. 57-81.
Karkouch A., et al., "Data Quality Enhancement in Internet of Things Environment," IEEE, 2015, 8 pages.
Kasteren T.V., et al., "Accurate Activity Recognition in a Home Setting," Conference Paper, Jan. 2008, 10 pages.
Khanna R., et al., "Control Theoretic Approach to Intrusion Detection Using a Distributed Hidden Markov Model," IEEE Wireless Communications, Aug. 2008, pp. 24-33.
Leckie C., et al., "A Probabilistic Approach to Detecting Network Scans," Network Operations and Managment Symposium, 2002 IEEE/IFIP, Apr. 2002, Retrieved from the Internet: https://ieeexplore.ieee.org/document/1015594, pp. 359-372.
Lin J., et al., "A Survey on Internet of Things: Architecture, Enabling Technologies, Security and Privacy, and Applications," IEEE Internet of Things Journal, Oct. 2017, vol. 4, No. 5, pp. 1125-1142.
Moore S.J., et al., "Impact Analysis of Erroneous Data on IoT Reliability", IEEE Smart World, Ubiquitous Intelligence & Computing, Advanced & Trusted Computing, Scalable Computing & Communications, Cloud & Big Data Computing, Internet of People and Smart City Innovation, 2019, pp. 1908-1915.
Ni K., et al., "Sensor Network Data Fault Types," ACM Transactions on Sensor Networks, ACM, 2 Penn Plaza, Suite 701 New York

(56) References Cited

OTHER PUBLICATIONS

NY 10121-0701 USA, vol. 5, No. 3, Jun. 4, 2009, XP058301703, ISSN: 1550-4859, DOI: 10.1145/1525856.1525863, pp. 1-29.

Nong Y., "A Markov Chain Model of Temporal Behavior for Anomaly Detection," Proceedings of the 2000 IEEE Workshop on Information Assurance and Security, Jun. 2000, pp. 171-174.

Notification of Grant for Great Britain Application No. 2006411.9, dated May 3, 2022, 2 pages.

Paschalidis I.C., et al., "Anomaly Detection in Sensor Networks based on Large Deviations of Markov Chain Models," Proceedings of the 47th IEEE Conference on Decision and Control, Dec. 9-11, 2008, pp. 2338-2343.

Rayes A., et al., "Internet of Things—From Hype to Reality: The Road to Digitization," Second Edition, 2019, 393 pages.

Saini N.K., "Trust Factor and Reliability-Over-a-Period-of-Time as Key Differentiators in IoT enabled Services," International Conference on Internet of Things and Applications (IOTA), 2016, pp. 411-414.

Santis G. De., et al., "Internet-Wide Scanners Classification using Gaussian Mixture and Hidden Markov Models," Nov. 26, 2018, 6 pages.

Search Report under Section 17 for Great Britain Application No. 2006411.9, mailed on Oct. 8, 2020, 4 pages.

Sicari S., et al., "A Secure and Quality-Aware Prototypical Architecture for the Internet of Things," Information Systems, Feb. 2016, 15 pages.

Sicari S., et al., "A Security-and Quality-Aware System Architecture for Internet of Things," Information Systems Frontiers, 2016, vol. 18, pp. 665-677.

Stiawan D., et al., "Anomaly Detection and Monitoring in Internet of Things Communication," 8th International Conference on Information Technology and Electrical Engineering (ICITEE), 2016, 4 pages.

Thanigaivelan N.K., et al., "Distributed Internal Anomaly Detection System for Internet-of-Things," 2016 13th IEEE Annual Consumer Communications & Networking Conference (CCNC), 2 pages.

Treinen, J.J., "Heuristics for improved enterprise intrusion Detection", PhD thesis, published in Jun. 2009, 119 pages.

* cited by examiner

| Sensor | 1 | 2 | 3 | 4 | 5 | 6 | 7 | 8 | 9 | 10 | 11 | 12 | 13 | 14 |
|--------|------|------|------|------|------|------|------|------|------|------|------|------|------|------|
| 1 | 27.3 | 0.0 | 9.1 | 0.0 | 27.3 | 0.0 | 0.0 | 9.1 | 0.0 | 0.0 | 9.1 | 0.0 | 18.2 | 0.0 |
| 2 | 0.0 | 53.6 | 14.3 | 0.0 | 1.2 | 0.0 | 14.3 | 0.0 | 3.6 | 0.0 | 1.2 | 2.4 | 0.0 | 9.5 |
| 3 | 0.0 | 13.9 | 25.4 | 0.8 | 1.6 | 2.5 | 1.6 | 1.6 | 35.2 | 0.0 | 2.5 | 0.8 | 1.6 | 12.3 |
| 4 | 3.2 | 0.0 | 0.0 | 41.9 | 25.8 | 12.9 | 0.0 | 0.0 | 0.0 | 3.2 | 9.7 | 0.0 | 3.2 | 0.0 |
| 5 | 3.5 | 8.1 | 15.1 | 7.0 | 38.4 | 8.1 | 3.5 | 1.2 | 0.0 | 3.5 | 7.0 | 0.0 | 4.7 | 0.0 |
| 6 | 5.7 | 5.7 | 2.9 | 8.6 | 22.9 | 8.6 | 0.0 | 0.0 | 0.0 | 11.4 | 11.4 | 0.0 | 22.9 | 0.0 |
| 7 | 0.0 | 2.8 | 19.4 | 2.8 | 11.1 | 2.8 | 52.8 | 0.0 | 0.0 | 2.8 | 2.8 | 0.0 | 2.8 | 0.0 |
| 8 | 0.0 | 0.0 | 0.0 | 0.0 | 8.3 | 33.3 | 0.0 | 33.3 | 0.0 | 0.0 | 16.7 | 0.0 | 0.0 | 8.3 |
| 9 | 0.0 | 8.9 | 66.1 | 0.0 | 0.0 | 3.6 | 0.0 | 0.0 | 17.9 | 0.0 | 0.0 | 0.0 | 0.0 | 3.6 |
| 10 | 0.0 | 0.0 | 0.0 | 15.4 | 30.8 | 15.4 | 0.0 | 0.0 | 0.0 | 7.7 | 7.7 | 7.7 | 15.4 | 0.0 |
| 11 | 0.0 | 2.4 | 0.0 | 7.1 | 19.0 | 9.5 | 2.4 | 7.1 | 0.0 | 0.0 | 42.9 | 0.0 | 1.8 | 0.0 |
| 12 | 0.0 | 0.0 | 60.0 | 0.0 | 20.0 | 0.0 | 0.0 | 0.0 | 0.0 | 0.0 | 0.0 | 20.0 | 0.0 | 0.0 |
| 13 | 5.3 | 2.6 | 0.0 | 2.6 | 34.2 | 7.9 | 0.0 | 2.6 | 0.0 | 5.3 | 2.6 | 0.0 | 36.8 | 0.0 |
| 14 | 0.0 | 9.6 | 32.7 | 1.9 | 0.0 | 3.8 | 0.0 | 0.0 | 0.0 | 1.9 | 1.9 | 0.0 | 0.0 | 48.1 |

SENSOR ANOMALY DETECTION

PRIORITY CLAIM

The present application is a National Phase entry of PCT Application No. PCT/EP2021/060459, filed Apr. 21, 2021, which claims priority from EP Patent Application No. 20172509.0, filed Apr. 30, 2020 and GB Patent Application No. 2006411.9, filed Apr. 30, 2020, each of which is hereby fully incorporated herein by reference.

TECHNICAL FIELD

The present disclosure relates to identifying anomalous data obtained by at least one of a plurality of sensors located within an environment.

BACKGROUND

Sensors can be deployed for a wide variety of purposes to monitor environmental conditions and/or interactions between people and their environment. For example, sensors can be used in an assisted living environment, to support an elderly or infirm person during their day-to-day lives. Using such sensors, the activity of the person can be identified. In this way, a fall of the person can be identified, and the person can be assisted as needed.

Over time, a sensor can fail or record spurious readings. This can interfere with the ability of the sensor to correctly monitor its environment. It is challenging to identify malfunctioning or inoperable sensors in a computationally efficient manner.

SUMMARY

It is an aim of embodiments of the present disclosure to at least alleviate some of the aforementioned problems.

According to a first aspect of the present disclosure, there is provided a method of identifying anomalous data obtained by at least one sensor of a plurality of sensors located within an environment, the method comprising: identifying, based on sensor data obtained from the plurality of sensors, at least one instance of a sequence of events that occurred within the environment; obtaining a probability of the sequence of events occurring within the environment under non-anomalous conditions; determining a frequency characteristic dependent on a frequency at which the sequence of events occurred within the environment; determining, based on a combination of the probability and the frequency characteristic, a likelihood of the sequence of events occurring within the environment at the frequency; and identifying, based on the likelihood, that at least a portion of the sensor data is anomalous.

In some examples, each event of the sequence of events corresponds to an activation of a respective sensor of the plurality of sensors.

In some examples, the probability is obtained using a trained statistical model. The trained statistical model may be trained using training data comprising further sensor data obtained from the plurality of sensors under the non-anomalous conditions, the further sensor data different from the sensor data.

In some examples, the probability is obtained using a Markov model of the sequence of events. The Markov model may be a first order Markov model, a second order Markov model or a third order Markov model, for example.

In some examples, the frequency characteristic represents the frequency.

In some examples, the sensor data is obtained for a predetermined period of time and the frequency represents a number of instances of the sequence of events that occurred within the predetermined period of time.

In some examples, determining the likelihood comprises applying a power function to the probability, wherein an exponent of the power function depends on the frequency.

In some examples, the method comprises identifying, based on the sensor data, a plurality of sequences of events that occurred within the environment, the plurality of sequences of events comprising the at least one instance of the sequence of events, wherein the frequency characteristic depends on the frequency and a further frequency at which the plurality of sequences of events occurred within the environment. The frequency characteristic may represent a ratio between the frequency and the further frequency.

In some examples, the plurality of sensors comprises at least one binary state-change sensor.

In some examples, the plurality of sensors are connected to a local network.

In some examples, the plurality of sensors comprises at least one of: a sensor of a user device and a user-wearable sensor.

In some examples, the method comprises sending an alert to a client device after identifying that at least the portion of the sensor data is anomalous.

In some examples, identifying that at least the portion of the sensor data is anomalous is based on comparing the likelihood and at least one threshold likelihood. The identifying that at least the portion of the sensor data is anomalous may be based on determining that the likelihood is less than or equal to a first threshold likelihood or determining that the likelihood is greater than or equal to a second threshold likelihood, higher than the first threshold likelihood.

In some examples, the method is performed periodically.

In some examples, the method comprises obtaining the sensor data, wherein the sensor data represents time-varying states of each of the plurality of sensors, respectively, and processing the sensor data to identify the at least one instance of the sequence of events.

In some examples, the method comprises identifying, based on the sensor data, a plurality of unique sequences of events that occurred within the environment, each of the plurality of unique sequences comprising a predetermined number of events, and identifying the at least one instance of the sequence of events from the plurality of unique sequences of events.

In some examples, the portion of the sensor data is anomalous due to at least one of: a battery charge level of a battery of the at least one of the plurality of sensors meeting or being below a threshold charge level, a fault of the at least one sensor, and anomalous activity of a user within the environment.

According to a second aspect of the present disclosure, there is provided a system comprising: storage for storing sensor data obtained from a plurality of sensors located within an environment; at least one processor configured to: identify, based on the sensor data, at least one instance of a sequence of events that occurred within the environment; obtain a probability of the sequence of events occurring within the environment under non-anomalous conditions; determine a frequency characteristic dependent on a frequency at which the sequence of events occurred within the environment; determine, based on a combination of the probability and the frequency characteristic, a likelihood of the sequence of events occurring within the environment at the frequency; and identify, based on the likelihood, that at least a portion of the sensor data is anomalous.

In some examples, each event of the sequence of events corresponds to an activation of a respective sensor of the plurality of sensors.

In some examples, the probability is obtained using a trained statistical model.

In some examples, the frequency characteristic represents the frequency.

According to a third aspect of the present disclosure, there is provided a computer-readable medium storing thereon a program for carrying out the method of the first aspect.

The disclosure includes any novel aspects described and/or illustrated herein. The disclosure also extends to methods and/or apparatus substantially as herein described and/or as illustrated with reference to the accompanying drawings. The disclosure is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The disclosure also provides a method of transmitting a signal, and a computer product having an operating system that supports a computer program for performing any of the methods described herein and/or for embodying any of the apparatus features described herein.

Any apparatus feature may also be provided as a corresponding operation of a method, and vice versa. As used herein, means plus function features may alternatively be expressed in terms of their corresponding structure, for example as a suitably-programmed processor.

Any feature in one aspect of the disclosure may be applied, in any appropriate combination, to other aspects of the disclosure. Any, some and/or all features in one aspect can be applied to any, some and/or all features in any other aspect, in any appropriate combination. Particular combinations of the various features described and defined in any aspects of the disclosure can be implemented and/or supplied and/or used independently.

As used throughout, the word 'or' can be interpreted in the exclusive and/or inclusive sense, unless otherwise specified.

The disclosure extends at least to methods of identifying anomalous data obtained by at least one sensor of a plurality of sensors, a system and a computer-readable medium substantially as described herein and/or substantially as illustrated with reference to the accompanying drawings.

BRIEF DESCRIPTION OF THE DRAWINGS

The present disclosure is now described, purely by way of example, with reference to the accompanying diagrammatic drawings, in which:

FIG. 3 is a schematic diagram of an example of a transition matrix.

DETAILED DESCRIPTION

The methods and apparatuses in accordance with the present disclosure provide the ability to detect anomalous data obtained by at least one sensor of a plurality of sensors within an environment. A probability of a given sequence of events that the plurality of sensors detected as occurring within the environment is obtained, and combined with a frequency characteristic dependent on a frequency at which the sequence of events occurred within the environment. In this way, the likelihood of that sequence occurring within the environment at this frequency is obtained. Based on the likelihood, it can be determined whether the data obtained by the sensors is anomalous, e.g. due to faulty operation of one or more of the sensors.

By combining the probability with the frequency characteristic, the detection of anomalies can be performed accurately. Such an approach has a relatively low computational load and can be deployed easily. This allows the present approach to be implemented in constrained environments, such as an Internet of Things (IoT) environment in which a plurality of IoT devices are arranged to communicate with each other over a network and to run various IoT applications (e.g. based on input from the sensors, at least one of which may itself form part of a respective IoT device). Furthermore, anomalies can be detected even if the amount of information provided by each sensor is relatively small, such as an on/off indication. This approach is therefore flexible and can be used with a wide variety of different sensors.

In particular, by obtaining the likelihood of a given sequence occurring at the frequency, one-time incidences of failure (which typically do not need to be addressed) can be distinguished from persistent faults (which typically should be addressed to improve the functionality of the sensor system). Sensors tend to generate spurious data relatively frequently, which is nevertheless not indicative of a critical fault. Hence, if spurious data is not adequately differentiated from genuine faults, an overwhelming number of false positives would be generated, which would seriously hinder the capability of correctly identifying and reacting to genuine faults. As the approach herein allows persistent faults to be effectively identified, the reliability of the systems herein is enhanced compared to existing systems.

Figure 1:
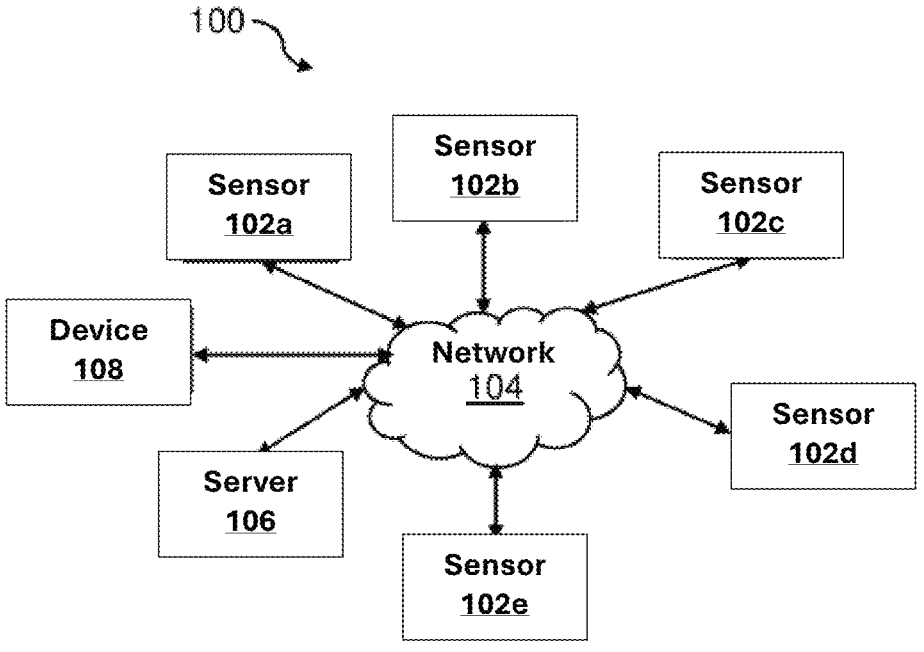
FIG. 1 is a schematic diagram showing an example system for use with the methods herein.

FIG. 1 is a schematic diagram showing an example system 100 for use with the methods herein, to put the method and apparatuses herein into context. The system 100 includes a plurality of sensors 102a-102e located within an environment. The sensors 102a-102e are configured to detect or otherwise sense at least one characteristic of the environment, such as a condition of the environment itself, e.g. temperature, or a condition resulting from an interaction between a person and the environment, e.g. whether a door has been opened. In FIG. 1, the environment is an internal environment, in this case, the interior of an apartment of a resident of an assisted living facility (who may be referred to herein as a user). The sensors 102a-102e in this case create a smart living environment, and sense information about the environment and the tasks the user is performing.

In this example, the apartment includes a bathroom, a kitchen, a bedroom and a lounge. The first sensor 102a senses the state of a bathroom door of a bathroom (i.e. whether it is open or closed), the second sensor 102b senses whether a toilet of the bathroom has been flushed, the third sensor 102c senses the state of a tap of a bathroom sink in the bathroom (i.e. whether it is turned on or turned off), the fourth sensor 102d senses the state of a kitchen door of a kitchen (i.e. whether it is open or closed) and the fifth sensor 102e senses the state of a refrigerator door of a refrigerator in the kitchen (i.e. whether the refrigerator door is open or closed). It is to be appreciated that FIG. 1 is merely an example and an environment may include more or fewer sensors than those shown in FIG. 1.

The sensors 102a-102e in this case are binary state-change sensors (sometimes referred to as binary contact sensors), which are for example low level sensors that register a change in state of a component using one of two values (e.g. a one or a zero). Each sensor is located on an object within the environment to record interaction between the user and that object. For example, the first sensor 102a is located on the bathroom door, and records the state of the bathroom door as a one if the door is open, and as a zero if the door is closed. A transition of a sensor from one state to another, e.g. from an off state to an on state, may be referred to herein as an activation of the sensor. From the sensors 102a-102e it is possible to determine the activity of the user based on the objects the user interacts with.

Such sensors typically provide low level data, which may be lacking in metadata and/or quality of service data to aid in the detection of anomalies. The amount of data recorded by such sensors therefore tends to be smaller than other, more complex, sensors. The sensor data obtained by binary state-change sensors can hence be processed and stored more efficiently.

However, such sensors tend to be prone to failure, spurious readings, interference and limited battery life. The ability to correctly determine the activity of the user is improved by the methods herein, which allow anomalies in sensor behavior to be accurately identified. It is to be appreciated that the methods herein also improve the detection of anomalies for other sensor types, which may be more reliable than binary state-change sensors but which may nevertheless suffer from anomalies from time to time.

The sensors 102a-102e are each connected to a local network 104 in FIG. 1. In this way, the sensors 102a-102e can communicate with each via the local network 104. The sensors 102a-102e in this case may therefore be considered to be comprised in the IoT; each sensor may be considered to be an IoT device. The network 104 may be a single network or may comprise a plurality of networks. The network 104 may be or include a wide area network (WAN), a local area network (LAN) and/or the Internet.

The sensors 102a-102e each record sensor data representing a time-varying state of the respective sensor (e.g. whether a given sensor is currently reading a one or a zero). It is to be appreciated that the state of a given sensor is time-varying in the sense that the state of the sensor may vary over time. However, the state of the sensor need not vary over time. For example, if the bathroom door remains closed for an entire period of time, the state of the first sensor 102a may remain unchanged over the period of time. Nevertheless, the state of the first sensor 102a is considered to be time-varying in that the state could have varied (in this case, if the user had opened the door). Furthermore, although in this case the state is a binary state, in other cases in which the sensor can obtain more complex data, such as a continuous value of a variable (e.g. an angular position of the bathroom door, rather than merely whether it is open or closed), the state may represent a continuous value (e.g. the angular position of the bathroom door over time).

The sensors 102a-102e can communicate the sensor data to each other if desired, e.g. to perform a given IoT functionality. In the example 100 of FIG. 1, the sensors 102a-102e send the sensor data to a server 106 via the network 104. The server 106 stores the sensor data and in this case processes the sensor data to identify anomalies. The server 106 in this case is a computer system (which may be a single physical device or distributed across multiple physical devices), such as that described with reference to FIG. 4.

After identifying that at least a portion of the sensor data is anomalous (e.g. using the methods described herein with reference to FIGS. 2 and 3), the server 106 sends an alert to a client device 108 via the network 104. The client device 108 in this case is a computing device, such as a desktop computer, laptop computer or mobile phone (e.g. a smartphone). The alert indicates to the client device 108 that at least the portion of the sensor data is anomalous, and may be in any suitable format, e.g. an electronic message (such as an email or text message) or a notification in an application associated with the sensors 102a-102e. Based on the alert, a user of the client device can take suitable action to address the anomaly, as discussed further with reference to FIG. 2. Of course, it will be appreciated that in other cases the alert may be sent to an automated system for further processing.

Figure 2:
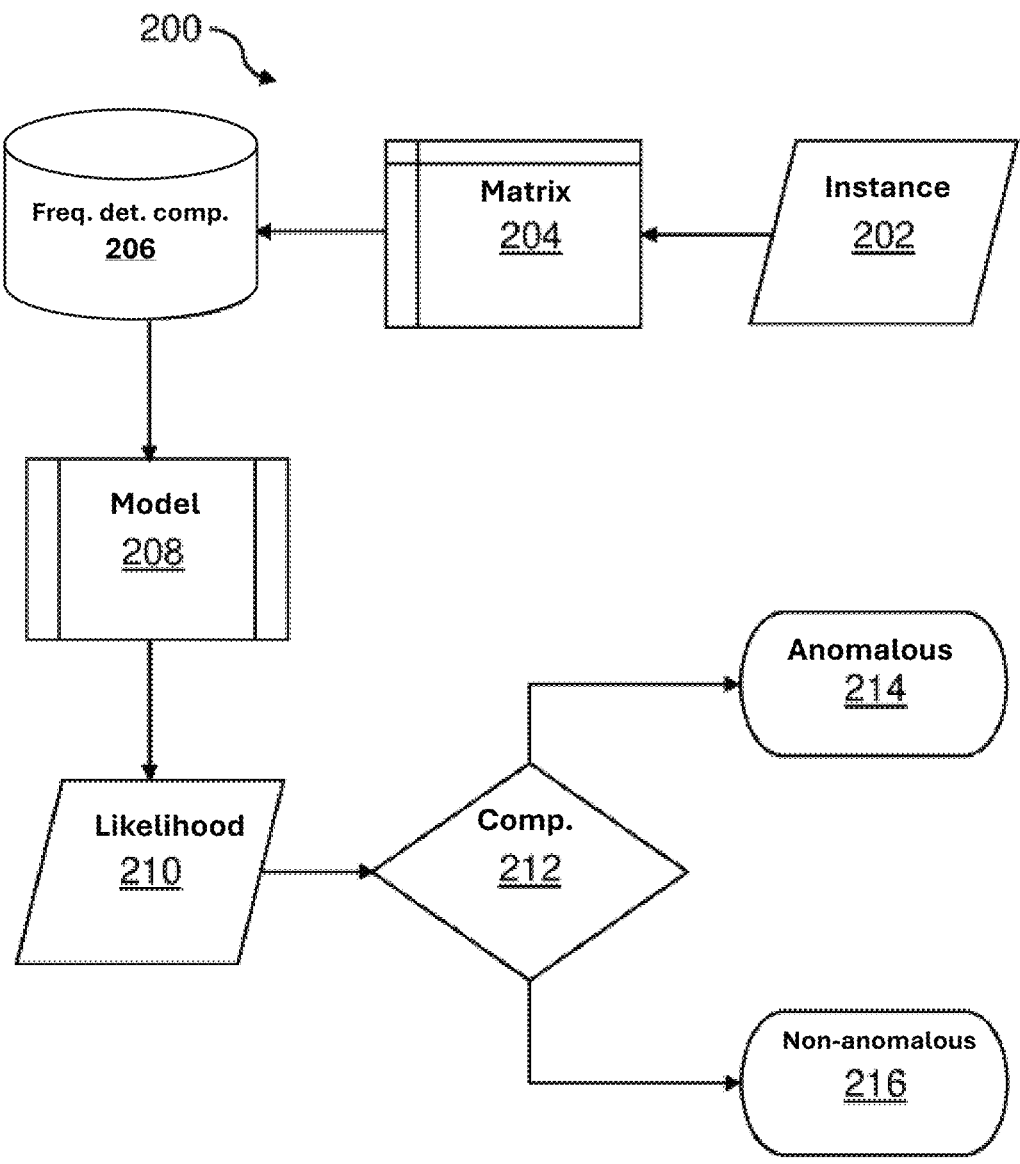
FIG. 2 is a flow diagram showing an example method of identifying anomalous data obtained by at least one of a plurality of sensors.

FIG. 2 is a flow diagram showing an example 200 of a method of identifying anomalous data obtained by at least one of a plurality of sensors located within an environment. The plurality of sensors may be similar to or the same as the sensors 102a-102e shown in FIG. 1 and in this case are binary state-change sensors.

At least one instance 202 of a sequence of events that occurred within the environment is identified based on sensor data obtained from the plurality of sensors, e.g. using a sequence identification component of a system for identifying anomalous data. Sequences of events typically adhere to certain logical flows, dependent on normal human behavior. For example, if a bathroom door has been opened, it is highly likely that the next event of the sequence corresponds to an interaction between the user and another object in the bathroom, such as the toilet being flushed or the bathroom sink being switched on. Hence, by identifying sequences of events that have occurred within the environment, anomalous sequences can in turn be identified. Such anomalous sequences can be indicative of anomalous data obtained by a sensor, allowing such anomalies to be identified and rectified if desired.

In this case, the sensor data (which in this case represents time-varying states of each of the plurality of sensors, respectively) is processed to identify the instance 202 of the sequence of events. The sensor data is in the form of discrete time-labelled data indicating when the state of the sensor changed from zero to one, and when the state of the sensor changed from one to zero. For example, for a sensor deployed on a door, the sensor data for that sensor represented a start time at which the door was opened and an end time at which the door was closed.

The sensor data was converted into sequences of events representing interactions between the user and the sensors over time. In other words, each change in state of the sensor corresponds to an event. In other cases in which a sensor is configured to record continuous values, an event may correspond to a change in a value recorded by the sensor that meets or exceeds a given condition. In either case, each event of the sequence of events may be considered to correspond to an activation of a respective sensor of the plurality of sensors.

It is to be appreciated that over a given period of time, e.g. 24 hours, a user will typically interact with a number of different objects around their home. The number of sensor events that occur within the given period may therefore be relatively high. In some cases, a plurality of unique sequences of events that occurred within the environment is identified based on the sensor data, where each of the plurality of unique sequences comprises a predetermined number of events. The predetermined number of events may be selected such that each sequence is sufficiently long to reflect typical activities of a user, but not so long that a single sequence represents a plurality of distinct, separate activities. This allows the sequence of events to more accurately reflect discrete activities of a user.

In some cases, a time at which each respective events occurred may be used to identify sequences of events, e.g. to identify the plurality of unique sequences. For example, if an amount of time between one event and a subsequent event meets or exceeds a given threshold, the event and the subsequent event may be considered to form part of separate sequences of events (rather than the same sequence).

Each sequence may be represented in the form of a vector, where a length of the vector corresponds to the number of events in the sequence. For example, a given event may be represented by a corresponding numerical value, and the position of the given event in the vector may represent the order in which it was performed, relative to the other events in the sequence. As an example, a vector, V, may take the form:

$$V = \begin{pmatrix} E_1 \\ E_2 \\ E_3 \end{pmatrix}$$

where $E_1$ represents a numerical value associated with a first event, $E_2$ represents a numerical value associated with a second event that occurred after the first event and $E_3$ represents a numerical value associated with a third event that occurred after the first and second events.

Once the plurality of unique sequences of events have been identified, the at least one instance 202 is identified from the plurality of unique sequences. There may be multiple instances of one or more of the unique sequences, e.g. if the user performs the same activity multiple times over the period within which the sensor data was collected. In the example of FIG. 2, the user opened the bathroom door, flushed the toilet and then re-opened the bathroom door. Hence, in this case, each instance 202 of the sequence of events can be represented as [bathroom door, toilet flush, bathroom door], which can be represented as a vector.

A probability of obtaining the sequence of events (for which the at least one instance 202 was identified) is obtained, e.g. using a probability calculation component. In examples such as that of FIG. 2, the probability is for obtaining this particular sequence of events under non-anomalous conditions, for example assuming normal or expected operation of the sensors.

In the example of FIG. 2, the probability is obtained using a trained statistical model, which embodies statistical assumptions regarding the sequences of events that may occur within the environment under non-anomalous conditions. A statistical model is a trained statistical model e.g. where parameter values of the model have been obtained based on expected sequences of events obtainable under the non-anomalous conditions.

In FIG. 2, the trained statistical model has been trained using training data representative of operation of the plurality of sensors under the non-anomalous conditions. In this case, the training data comprises further sensor data obtained from the plurality of sensors under the non-anomalous conditions, although in other cases the training data may be artificially generated training data representing expected behavior of the plurality of sensors, rather than data obtained during actual operation of the plurality of sensors. In FIG. 2, the further sensor data may be obtained prior to use of the method of FIG. 2 for identifying anomalies, e.g. before the sensor data is collected. The further sensor data may be obtained from the sensors during a previous period in which the user interacted with the environment according to a usual routine, so that the further sensor data accurately reflects common sequences of events that the user performs as they go about their daily life within the environment.

In FIG. 2, the probability is obtained using a Markov model of the sequence of events. In this case, the probability represents an element of a transition matrix 204 associated with a Markov chain for the sequence of events. The Markov chain in this case is an example of a trained statistical model, which has been trained using training data representative of operation of the plurality of sensors under the non-anomalous conditions. The training data in this example has been used to obtain the transition matrix 204, which may be considered to be a trained transition matrix 204.

As will be appreciated, the transition matrix 204 (or other engine or component for obtaining the probability) may be retrained as desired. For example, additional training data, e.g. for retraining the transition matrix 204, may be obtained when an existing user ceases to interact with the environment and a new user begins interacting with the environment.

Referring back to FIG. 2, in this example, a Markov chain is used to obtain the probability of the sequence of events occurring within the environment under non-anomalous conditions. A Markov chain is a stochastic model for representing sequences of events (which may be referred to as states). An order of a Markov chain indicates how many previous states are taken into account in order to determine the probability of a given event occurring. For example, in a first order Markov chain, the probability of a given event occurring (in this case a transition to a given state) depends only on the current state. In a second order Markov chain, the probability of the given event occurring depends on the current state, and the state immediately prior to the current state. Similarly, in a third order Markov chain, the probability of the given event occurring depends on the current state (which may be referred to as the state at a time t), the state immediately prior to the current state (which may be referred as the state at a time t−1), and the state immediately prior to that (which may be referred to as the state at a time t−2).

The approaches herein can be applied to any order of Markov chain. Increasing the order of the Markov chain tends to increase the accuracy of anomaly detection up to a certain order. However, the computational intensity also increases. The inventors have found that first, second and third order Markov chains, and especially third order Markov chains, provide particularly good performance, especially in systems with limited computational resources such as IoT systems.

In the present context, a state of a Markov chain can be considered to correspond to a sensor interaction such as an event, which e.g. corresponds to a change in state of the sensor, such as a sensor activation. For example, for the sequence [bathroom door, toilet flush, bathroom door], the state at t−2 may be considered to be the opening of the bathroom door, the state at t−1 may be considered to be the flushing of the toilet, and the state at t may be considered to be the opening of the bathroom door.

As explained above, the transition matrix 204 in FIG. 2 has been trained on further sensor data reflecting the normal interactions between the user and the environment. This results in an array providing the probability of a change in state of a given sensor, given a previous change in state of at least one sensor (which may include the given sensor).

An example of a transition matrix 300 is shown schematically in FIG. 3 for a plurality of binary state-change sensors with two possible states: an on (activated) state or on off (unactivated) state. The top row 302 of the transition matrix 300 represents the plurality of sensors in columns from i=1 to i=14 and the leftmost column 304 of the transition matrix 300 represents the plurality of sensors in rows from j=1 to j=14. The value of the element of the ith column and the jth row represents the probability of moving from a state with the ith sensor activated to a state with the jth sensor activated. The transition matrix 300 in this example is therefore a two dimensional array providing the probability of an activation of one sensor and a subsequent activation of another sensor within a given environment.

Referring back to FIG. 2, the probability of a given sequence of events occurring within the environment can be calculated from the transition matrix 204 using equation (1) for a first order Markov chain, equation (2) for a second order Markov order or equation (3) for a third order Markov chain:

$$P(S(t)|S(t-1)) \tag{1}$$

$$P(S(t)|S(t-1),S(t-2)) \tag{2}$$

$$P(S(t)|S(t-1),S(t-2),S(t-3)) \tag{3}$$

where P represents the probability, S represents the activation of a given sensor and t is a time interval. In this case, the sequence of events is a sequence of activations of the sensor S. In other words, equation (1) represents the probability of the sensor S being activated at time t given that it was activated at time t−1.

Similar equations can be used to obtain the probability of a sequence of events comprising activations of different sensors. For example, the probability P of a sequence of events comprising activation of sensor $S_i$ at time t given that sensor $S_j$ was activated at time t−1 can be obtained using the following equation for a first order Markov chain:

$$P(S_i(t)|S_j(t-1)) \tag{4}$$

It is to be appreciated that similar approaches may also be used to obtain a probability of a given sequence of events for Markov chains of an nth order.

After obtaining the probability of a sequence of events occurring using the transition matrix 204, a frequency characteristic is obtained from a frequency determination component 206. The frequency characteristic is dependent on a frequency at which the sequence of events occurred within the environment.

In the example of FIG. 2, the frequency characteristic represents the frequency. The frequency may be considered a measured frequency in that it is the actual frequency at which the sequence of events is identified to have occurred at. In this case, the frequency determination component 206 includes a database that is updated each time it receives a unique sequence of events. The database is configured to store each unique sequence of events itself, e.g. in the form of a vector. At a given time, the frequency at which the sequence of events occurred is determined by the frequency determination component 206 based on the number of unique sequences stored in the database and a time period over which the unique sequences were obtained by the sensors. After the method of identifying anomalous data is performed for a given time period, the unique sequences of events may be removed or otherwise cleared from the database and the frequency determination component 206 may begin to store new unique sequences for a further time period, for identifying anomalies occurring during the further time period.

A likelihood of the sequence of events occurring within the environment at the frequency is then determined based on a combination of the probability (in this case, obtained by the transition matrix 204) and the frequency characteristic (which in this case represents the frequency at which the sequence of events occurred). In FIG. 2, this likelihood is obtained by a likelihood calculation component, which in this example comprises a combined Markov model 208. By combining the probability of the sequence of events occurring with the frequency characteristic, the method 200 of FIG. 2 accounts for both the likelihood of a particular sequence occurring and the rate at which the particular sequence has occurred. In other words, the frequency characteristic has a direct impact on the overall likelihood, meaning that sequences that occur at an unusually low or high frequency can be accurately identified as anomalous.

The probability and the frequency characteristic can be combined in any suitable way to obtain the likelihood of the sequence of events occurring within the environment at the frequency. In the example of FIG. 2, a combined Markov model 208 is used to obtain the likelihood 210. Determining the likelihood in this case comprises applying a power function to the probability. An exponent of the power function depends on the frequency in this example. Hence, in this case, the probability obtained using the transition matrix 204 (e.g. using equations (1), (2) or (3) for first, second or third order Markov chains) is raised by the power x, where x represents the frequency. For example, equation (5) may be used to obtain the likelihood, $\mathcal{L}$, for a second order Markov chain:

$$\mathcal{L} = P(S(t)|(t-1),S(t-2))^x \tag{5}$$

where P represents the probability, S represents the activation of a given sensor, t is a time interval and x is the frequency.

With this approach, sequences that occur more frequently (with a larger x) result in a smaller value for the likelihood 210. Similarly, sequences which are relatively unlikely to occur (with a smaller P) also result in a smaller value for the likelihood 210. Hence, both such sequences can be appropriately identified as anomalous.

After obtaining the likelihood 210, the method 200 of FIG. 2 involves identifying whether at least a portion of the sensor data obtained by the plurality of sensors is anomalous. In FIG. 2, the likelihood 210 is compared 212 with at least one threshold likelihood. Based on the comparison 212, either at least a portion of the sensor data (e.g. the portion of the sensor data representing a particular sequence of events) is identified as anomalous 214 or the sensor data (or a portion thereof) is identified as non-anomalous 216 (e.g. normal or within expected bounds).

The threshold likelihood against which the likelihood 210 is compared 212 typically depends on the sensor data and may be tuned over time as a user continues to interact with the sensors, e.g. to reduce false alarms. In some cases, the threshold likelihood includes a first threshold likelihood, which is e.g. a minimum likelihood. A particular sequence of events (and hence a portion of sensor data associated with that sequence of events) can be identified as anomalous if the likelihood 210 for that sequence of events is less than or equal to the first threshold likelihood. If the likelihood 210 for that sequence is less than the first threshold likelihood, this indicates that the sequence has occurred less frequently than expected, indicating that at least a portion of the sensor data representing the sequence is anomalous. For example, a sequence of events corresponding to using the toilet may be expected to occur at least once a day. If the likelihood 210 for this particular sequence as determined using the frequency characteristic is below the first threshold likelihood, this indicates that this sequence has occurred less frequently (e.g. less than once a day) and that at least a portion of the sensor data corresponding to this sequence is anomalous.

The threshold likelihood may also or instead include a second threshold likelihood, which is e.g. a maximum likelihood. A given sequence of events (and hence a portion of sensor data associated with the given sequence) can be identified as anomalous based on determining that the likelihood 210 for that sequence of events is greater than or equal to the second threshold likelihood. For example, a sequence of events corresponding to using the toilet may be expected to occur up to 10 times a day. If the likelihood 210 for this particular sequence as determined using the frequency characteristic is below the second threshold likelihood, this indicates that this sequence has occurred more frequently than this (e.g. more than 10 times a day) and that at least a portion of the sensor data corresponding to this sequence is anomalous.

In some cases, the likelihood 210 may be compared against both the first and second threshold likelihoods to determine whether it is greater than the first threshold likelihood and less than the second threshold likelihood, and therefore non-anomalous. In these cases, the second threshold likelihood is higher than the first threshold likelihood. This allows sequences that occur either less frequently or more frequently than expected to be identified as anomalous.

If the portion of the sensor data is identified as anomalous, an alert can be generated, and e.g. sent to a client device, as explained with reference to FIG. 1. A user of the client device may then carry out a suitable check to ascertain whether the sensors associated with the portion of the sensor data (e.g. the sensors in the bathroom in an example in which the sequence of events corresponding to using the toilet appears anomalous) are functioning correctly.

A portion of the sensor data may be anomalous if a battery charge level of a battery of a sensor meets or is below a threshold charge level, i.e. if the sensor has run out of or is running out of battery power. If the battery charge level meets or is below the threshold, the sensor typically fails to operate. Battery failure is a pervasive problem, especially in IoT systems in which sensors may have limited battery life. Hence, identifying battery failure using the examples herein can improve the robustness of such systems.

The portion of the sensor data may also or instead be anomalous due to a fault of a sensor. For example, the sensor data obtained by the sensor may not accurately reflect underlying environmental conditions. In one case, the sensor may enter a so-called "fail dirty" state, in which the sensor data obtained by the sensor appears to be within normal bounds but the sensor has actually failed and the sensor readings are therefore invalid. Such errors can be difficult to identify as, taken alone, the sensor data appears normal.

However, the readings of a sensor with such a fault may lead to unusual sequences of events when combined with readings of other sensors. By identifying such anomalous sequences using the methods herein, sensor faults can be effectively identified.

Although the methods herein can be used to effectively identify malfunctioning or inoperable sensors, it is to be appreciated these methods can additionally or alternatively be used to more precisely identify anomalous activity of the user within the environment. In such cases, the sensor data itself may accurately reflect the environmental conditions, but the environmental conditions themselves are anomalous, e.g. due to unusual behavior of the user. This may occur if the user is unexpectedly incapacitated, e.g. due to a fall. By identifying anomalous sequences such as this using the methods herein, such unusual behavior can be identified. An alert can be generated and a check of the environment can be performed and the user can be helped as needed. This can improve the safety of an environment, for example for vulnerable users such as the elderly.

In some cases, a likelihood that is identified as non-anomalous, e.g. that exceeds a first threshold likelihood and/or is less than a second threshold likelihood, may nevertheless be identified as potentially anomalous based on the value of the likelihood. For example, if the likelihood is relatively close to the first or second threshold likelihoods, the sequence of events associated with the likelihood may be identified as potentially anomalous. A further alert may be generated for such potentially anomalous sequences, allowing sensors associated with these sequences to be investigated if desired.

Methods such as the method 200 of FIG. 2 may be performed periodically, e.g. at predetermined intervals (which may be constant or time-varying) such as once every twenty-four hours. In this way, the environment can be monitored over time, to identify anomalous sensor data as it is obtained. This enhances the reliability of the plurality of sensors by allowing anomalies to be detected (and corrected for, if appropriate) at an early stage. In some examples, the sensor data is obtained for a predetermined period of time and the frequency represents a number of instances of the sequence of events that occurred within the predetermined period of time. For example, sensor data may be collected over the predetermined period of time, such as over a 24-hour period, and may then be analyzed to identify unique sequences of events and to determine whether any of the unique sequences of events are anomalous. This process may then be repeated for each of a plurality of subsequent periods of time, e.g. for subsequent days.

Figure 4:
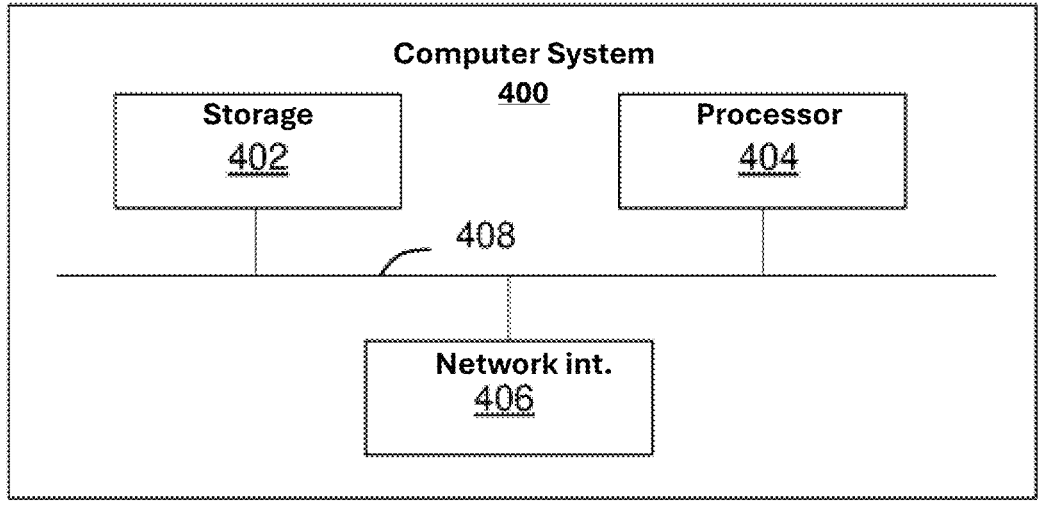
FIG. 4 is a schematic diagram showing internal components of an example computer system.

FIG. 4 is a schematic diagram of internal components of a system that may be used to implement any of the methods described herein, which in this example is a computer system 400. For example, the computer system 400 may be used as the server 106 and/or the client device 108 of FIG. 1. The computer system 400 in FIG. 4 is implemented as a single computer device but in other cases a similar computer system may be implemented as a distributed system.

The computer system 400 includes storage 402 which may be or include volatile or non-volatile memory, read-only memory (ROM), or random access memory (RAM). The storage 402 may additionally or alternatively include a storage device, which may be removable from or integrated within the computer system 400. For example, the storage 402 may include a hard disk drive (which may be an external hard disk drive such as a solid state disk) or a flash drive. The storage 402 is arranged to store data, temporarily or indefinitely. The storage 402 may be referred to as memory, which is to be understood to refer to a single memory or multiple memories operably connected to one another.

The storage 402 may be or include a non-transitory computer-readable medium. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

In FIG. 4, the storage 402 is arranged to store sensor data obtained from a plurality of sensors located within an environment, such as the sensors 102a-102e of FIG. 1.

The computer system 400 also includes at least one processor 404 which is configured to implement any of the methods described herein. The at least one processor 404 may be or comprise processor circuitry. The at least one processor 404 is arranged to execute program instructions and process data, such as the sensor data. The at least one processor 404 is for example arranged to process instructions, obtained from the storage 402, to implement any of the methods described herein. The at least one processor 404 may include a plurality of processing units operably connected to one another, including but not limited to a central processing unit (CPU) and/or a graphics processing unit (GPU).

The computer system 400 further includes a network interface 406 for connecting to a network, such as the network 104 of FIG. 1. A computer system otherwise similar to the computer system 400 of FIG. 4 may additionally include at least one further interface for connecting to at least one further component, such as a display interface for connecting to a display device (which may be separable from or integral with the computer system). The components of the computer system 400 are communicably coupled via a suitable bus 408.

Alternatives and Modifications

Each feature disclosed herein, and (where appropriate) as part of the claims and drawings may be provided independently or in any appropriate combination.

The environment of FIG. 1 is merely an example. Sensors in accordance with examples herein may be deployed in various other environments, which may be or include an outdoor environment.

The sensors 102a-102e of FIG. 1 are merely provided as an example. It is to be appreciated that various other sensors are possible in other examples, including sensors that are user-wearable, such as a biometric sensor that senses at least one biometric characteristic of a user, e.g. heart rate or blood pressure, and/or an activity monitor that senses activity of the user, e.g. number of steps taken or distance travelled.

In some cases, the sensors may include a sensor of a user device, such as an IoT (Internet of Things) device. An IoT device is for example a device with the means to communicate data within the environment, e.g. over a network local to the environment. Examples of IoT devices include connected refrigerators, which can provide convenient online grocery shopping functionality, smart televisions (TVs) and voice assistant devices. Such IoT devices may include a sensor, which may perform the function of the sensors described herein. For example, a connected refrigerator may include a sensor to sense whether the door of the refrigerator is open or closed.

In FIG. 2, the probability of the sequence of events occurring within the environment under non-anomalous conditions is obtained and then the frequency characteristic is determined. In other cases, though, the frequency characteristic may be obtained before or at the same time as the probability of the sequence of events occurring is obtained.

In FIG. 2, the frequency determination component 206 stores the unique sequences of events themselves. However, in other cases, the frequency determination component 206 may instead store an indication of each unique sequence or a count of the number of each unique sequence received, rather than storing the sequences themselves. These are merely examples, though, and in yet further cases, the frequency determination component 206 may store other data that nevertheless allows the frequency characteristic, such as the frequency at which the sequence of events occurred, to be determined.

FIG. 2 illustrates an example in which the frequency characteristic represents the frequency at which the sequence of events occurred within the environment. This is merely an example, though, and in other cases the frequency characteristic may differ while nevertheless being dependent on the frequency at which the sequence of events occurred within the environment.

In some cases, the frequency characteristic may depend on the frequency at which the sequence of events occurred and a further frequency at which a plurality of sequences of events occurred within the environment. The plurality of sequences of events may be identified based on the sensor data and include the at least one instance of the sequence of events.

For example, for a second order Markov chain, the probability of a given sequence of events occurring within the environment can be calculated using equation (2) above as $P(S(t)|S(t-1),S(t-2))$. The likelihood of the sequence of events occurring within the environment at the frequency may be computed as a joint probability, using equation (6):

$$P(S(t),S(t-1),S(t-2)) \qquad (6)$$

where P represents the probability, S represents the activation of a given sensor and t is a time interval.

To obtain such a likelihood, a probability obtained using a model derived from training data (in this case, a Markov transition matrix) can be combined with a frequency characteristic obtained from the sensor data (representing the measurements received from the sensors during operation of the sensors). For example, using Bayes' theorem, the joint probability may be represented using equation (7):

$$P(S(t), S(t-1), S(t-2)) = P(S(t) | S(t-1), S(t-2))P(S(t-1), S(t-2)) \qquad (7)$$

where P represents the probability, S represents the activation of a given sensor and t is a time interval. $P(S(t)|S(t-1), S(t-2))$ can be obtained from a transition matrix such as the transition matrices 204, 300 described with reference to FIGS. 2 and 3 above. $P(S(t-1), S(t-2))$ can be obtained from the sensor data, and depends on the frequency at which the sequence of events occurred within the environment and a further frequency at which the plurality of sequences of events occurred within the environment. For example, $P(S(t-1)=s(t-1), S(t-2)=s(t-1))$ can be approximated using equation (8):

$$P(S(t-1) = s(t-1), S(t-2) = s(t-1)) \approx \qquad (8)$$

$$\frac{\text{no. pairs of } (s(t-1), s(t-2))}{\text{total no. pairs of } S(t-1), S(t-2)}$$

where P represents the probability, t is a time interval, s(t−1) and s(t−2) represent the measured events that occurred at t−1 and t−2 in the sequence of events, S(t−1) and S(t−2) represent two successively occurring events of the plurality of sequences of events, and equation (8) is evaluated over a predetermined time period over which the sensor data is obtained. It is to be appreciated that the number of pairs of s(t−1) and s(t−2) corresponds to the number of instances of the sequence of events that occurred over the predetermined time period. The number of pairs of s(t−1) and s(t−2) hence depend on the frequency at which the sequence of events occurred within the environment. The total number of pairs of S(t−1) and S(t−2) corresponds to the total number of instances of two successive events that occurred over the predetermined time period. The total number of pairs of S(t−1) and S(t−2) hence depends on the frequency at which the plurality of sequences of event occurred within the environment, where in this example each of the plurality of sequences are of a given length (two events in this case). In this case, the frequency characteristic represents a ratio between the frequency and the further frequency at which the plurality of sequences of events occurred. However, it is to be appreciated that this is merely an example.

By combining P(S(t)|S(t−1), S(t−2)) and P(S(t−1)=s(t−1), S(t−2)=s(t−1)), the likelihood P(S(t), S(t−1), S(t−2)) can be obtained, which in this case corresponds to a joint likelihood. The likelihood can be compared to at least one threshold likelihood as described with reference to FIG. 2 to identify whether at least a portion of the sensor data is anomalous.

Any reference numerals appearing in the claims are for illustration only and shall not limit the scope of the claims.

The invention claimed is:

1. A method of identifying anomalous data obtained by at least one sensor of a plurality of sensors located within an environment and communicatively coupled to a communications network, the method comprising:

generating sensor data by the plurality of sensors that comprises at least one of a sensor of a user device to monitor environmental conditions within an environment or a user-wearable sensor to monitor interactions between a user and the environment;

identifying, by a computer system based on the generated sensor data obtained from the plurality of sensors via the communications network, at least one instance of a sequence of events that occurred within the environment;

obtaining, by the computer system, a probability of the sequence of events occurring within the environment under non-anomalous conditions;

determining, by the computer system, a frequency characteristic dependent on a frequency at which the sequence of events occurred within the environment;

determining, by the computer system based on a combination of the probability and the frequency characteristic, a likelihood of the sequence of events occurring within the environment at the frequency;

identifying, by the computer system based on the likelihood, that at least a portion of the sensor data is anomalous; and initiating an alert by the computer system via the communications network to prompt a check of at least one of: at least one sensor of the plurality of sensors, or the environment.

2. The method according to claim 1, wherein each event of the sequence of events corresponds to an activation of a respective sensor of the plurality of sensors.

3. The method according to claim 1, wherein the probability is obtained using a trained statistical model.

4. The method according to claim 3, wherein the trained statistical model is trained using training data comprising further sensor data obtained from the plurality of sensors under the non-anomalous conditions, the further sensor data being different from the sensor data.

5. The method according to claim 1, wherein the probability is obtained using a Markov model of the sequence of events.

6. The method according to claim 5, wherein the Markov model is a first order Markov model, a second order Markov model, or a third order Markov model.

7. The method according to claim 1, wherein the frequency characteristic represents the frequency.

8. The method according to claim 1, wherein determining the likelihood comprises applying a power function to the probability, wherein an exponent of the power function depends on the frequency.

9. The method according to claim 1, further comprising:

identifying, by the computer system and based on the generated sensor data, a plurality of sequences of events that occurred within the environment, the plurality of sequences of events comprising the at least one instance of the sequence of events, the frequency characteristic depending on the frequency and a further frequency at which the plurality of sequences of events occurred within the environment.

10. The method according to claim 9, wherein the frequency characteristic represents a ratio between the frequency and the further frequency.

11. The method according to claim 1, wherein the plurality of sensors comprises at least one binary state-change sensor.

12. The method according to claim 1, wherein initiating an alert by the computer system further comprises sending an alert to a client device via the communications network.

13. The method according to claim 1, wherein identifying that at least the portion of the generated sensor data is anomalous is based on comparing the likelihood and at least one threshold likelihood.

14. The method according to claim 13, wherein the identifying that at least the portion of the sensor data is anomalous is based on one of:

determining that the likelihood is less than or equal to a first threshold likelihood, or determining that the likelihood is greater than or equal to a second threshold likelihood higher than the first threshold likelihood.

15. The method according to claim 1, further comprising:

obtaining the generated sensor data by the computer system, wherein the generated sensor data represents time-varying states of each of the plurality of sensors, respectively; and processing the generated sensor data by the computer system to identify the at least one instance of the sequence of events.

16. The method according to claim 1, further comprising:

identifying, by the computer system, based on the generated sensor data, a plurality of unique sequences of events that occurred within the environment, each of the plurality of unique sequences comprising a predetermined number of events; and identifying, by the computer system, the at least one instance of the sequence of events from the plurality of unique sequences of events.

17. The method according to claim 1, wherein the portion of the generated sensor data is anomalous due to at least one of: a battery charge level of a battery of the at least one of the plurality of sensors meeting or being below a threshold charge level, a fault of the at least one sensor, or anomalous activity of a user within the environment.

18. The method according to claim 1, wherein the plurality of sensors comprises at least one sensor that is located on an object within the environment to record interaction between the user and the object.

19. A system comprising:

a plurality of sensors located within an environment, wherein the plurality of sensors comprises at least one of a sensor of a user device to monitor environmental conditions within the environment, or user-wearable sensor to monitor interactions between a user and the environment;

storage for storing sensor data obtained from the plurality of sensors; and at least one processor configured to:

identify, based on the sensor data, at least one instance of a sequence of events that occurred within the environment, obtain a probability of the sequence of events occurring within the environment under non-anomalous conditions, determine a frequency characteristic dependent on a frequency at which the sequence of events occurred within the environment, determine, based on a combination of the probability and the frequency characteristic, a likelihood of the sequence of events occurring within the environment at the frequency, identify, based on the likelihood, that at least a portion of the sensor data is anomalous, and initiating an alert by the computer system via the communications network for a check of at least one of: at least one sensor of the plurality of sensors, or the environment.

* * * * *